(12) United States Patent
Yoon

(10) Patent No.: US 7,356,562 B2
(45) Date of Patent: Apr. 8, 2008

(54) DYNAMIC GENERATOR FOR FAST-CLIENT STATIC PROXY FROM SERVICE INTERFACE DEFINITION DOCUMENT

(75) Inventor: Young-Jun Yoon, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 895 days.

(21) Appl. No.: 10/428,206

(22) Filed: Apr. 30, 2003

(65) Prior Publication Data
US 2004/0221017 A1   Nov. 4, 2004

(51) Int. Cl.
*G06F 15/16* (2006.01)
(52) U.S. Cl. .................. 709/203; 709/201; 709/203; 709/217; 709/218; 709/219
(58) Field of Classification Search ................ 709/201, 709/203, 217–219
See application file for complete search history.

(56) References Cited

U.S. PATENT DOCUMENTS 7,000,238 B2 * 2/2006 Nadler et al. ............... 719/330
2003/0070006 A1 * 4/2003 Nadler et al. ............... 709/330
2004/0064503 A1 * 4/2004 Karakashian et al. ....... 709/203

* cited by examiner

*Primary Examiner*—Nathan Flynn
*Assistant Examiner*—Mohamed Wasel
(74) *Attorney, Agent, or Firm*—Cantor Colburn LLP; Geraldine Monteleone

(57) ABSTRACT

Providing APIs for dynamically generating fast client-side proxies given any type of service interface specification/definition document, such as IDL, WSDL or JMX MBean descriptors, so as to provide fast communication with distributed clients as well as dynamically allowing server interfaces to be updated without burdening clients for generation/assembly of distributed communication client stubs. A dynamic static-proxy invocation gateway is utilized along with a plurality of novel dynamic static-proxy invocation generators, one being associated with each specific service available for use on the servers. The invocation gateway receives requests for service from a client side stub, ascertains the service to be accessed by the client requests, and causes the appropriate generator to create dynamically a static client-side proxy for the requested service, if one does not yet exist.

2 Claims, 2 Drawing Sheets

DYNAMIC GENERATOR FOR FAST-CLIENT STATIC PROXY FROM SERVICE INTERFACE DEFINITION DOCUMENT

BACKGROUND OF THE INVENTION

The present invention relates in general to distributed computer systems having multiple clients and multiple servers which are dynamically coupled and decoupled as needed, and in particular to systems, methods and computer program products for dynamically generating fast client-side proxies given any type of service interface specification/definition document, such as IDL, WSDL or JMX Mbean descriptors, and the like.

In the now-popular and widely used client/server model of computing, a requesting program, called the client, often must make a request of a service-providing program, called a server. In a distributed computing environment, the server program is often located remotely on a computer network, and in such instances these requests are often called RPCs (Remote Procedure Calls). In the networks of larger enterprises, there are often one or more computers (also often called servers) dedicated to the role of servicing requests from a multitude of individual workstations and still other computers on the network. Such computer servers may include email servers, firewall servers, storage servers, application servers, database servers, web servers, and the like. Often times, there are a group of local computers, connected together on a LAN (Local Area Network) that can communicate or obtain data from still other computers connected through a WAN (Wide Area Network) or the Internet. In recent years, due to the explosive growth of the Internet, there has been a definite trend to making not only information in the form of web pages available at distant web sites over the Internet, but also making available the use of remotely located computer programs (called applications) over the Internet. Thus, many applications used by workstations or other user terminals are now found on remote servers. The present invention is directed toward improvements in the ways these RPCs are made, particularly in light of frequent changes or updates made to the capabilities of the server programs. To better explain the present invention, it is useful to review certain current practices.

Server computers, whether on a LAN, WAN or on a website, are designed to be used or accessed by many users concurrently. Each server typically has a multitude of programs on them, and often supports a multiplicity of different services. A small network installation may have all of its services and server programs on a single computer, while larger websites or enterprises may have them distributed among several computers or several LANs interconnected by a network or the Internet.

In a distributed computing environment, when the requesting program (the client) makes a request of a server program, it may suspend at least part of its operation until the results of the remote procedure call are returned. This in turn may precipitate still further calls on the local computer on which the client is located. The use of lightweight processes or threads that share the same address space within a computer or a tight cluster of computers on a network often allow multiple RPCs to be performed concurrently. Nonetheless, from both an administration viewpoint and a computer user's viewpoint, quickly fulfilling specific user requests is important, regardless of how many underlying RPCs had to be made by the local computer and/or remote server computer carry it out. In general, delays of more than a few seconds are generally not well received. Thus, having quick responses to RPCs is important, even as network and server traffic becomes heavy.

To accomplish an RPC, program statements must be executed on the requesting computer. When program statements that use RPC are compiled into an executable program, a "stub" is included in the compiled code that acts as the representative of the remote procedure code. When that program is run and the procedure call is issued, the stub receives the request and forwards it to a client runtime program in the local computer on which the client is located. The runtime program of the client has the knowledge of how to address the remote computer and the server application located thereon. It sends the appropriate messages across the network as may be required in order to request the desired procedure, which often is called a method. Thus, this act of a client requesting something is sometimes referred to as "method invocation." When done remotely it is called Remote Method Invocation (RMI).

In a typical distributed computing environment, there is a need to update periodically various applications and user programs located on servers and the computers of end users due to software upgrades, increased security measures, network and/or operating system upgrades, reliability improvements, software patches, and the like. On a network, this task is made somewhat simpler by grouping together related applications and/or making them available in connection with or through a particular kind of installed "service." These services are typically designed to facilitate seamless communications and interoperability of extended or enterprise networks. In larger networks in particular, there are often multiple services provided, such as CORBA (Common Object Request Broker Architecture) Service, WebService, and Java MBean Service, among others.

In a complex distributed computer environment, one approach to the task of upgrading applications and those client programs which use them, at least for those written using object-oriented programming, is to provide centrally located definitions for the various application programs which can be easily updated. These definitions typically are on a service-by-service basis and are called Service Interface Definition Documents (SIDDs). SIDDs specify various interface attributes, variables, arguments, class information or other parameters associated with accessing that service as implemented on the server system. The SIDDs may be stored for access by clients in an interface repository which is typically a secure location on a server.

By accessing and making use of these interface definitions, particularly after they are updated to reflect improved functionality or capabilities for the application, classes or objects referenced thereby, the client programs which call or invoke these services and their applications can have the benefit of the latest updates. The present invention is concerned with the specific processes and limitations associated with these updated SIDDs, particularly as they affect the manner in which the Remote Procedure Calls (RPCs) made by the multitude of clients on a typical network need to be carried out.

Currently, in object-oriented distributed client/server computing environments, in order for client programs to initiate communication with and use an application defined in any one of the available services, which typically are located on a remote server, there are two different method invocations (i.e, RPCs) that are used. Each will now be described. The first type is called "static method invocation." It requires the pre-generation of client side proxies/stubs based on its Service Interface Definition document during assembly and deployment phases of the distributed client's life cycle. The second type is called "dynamic method invocation." It requires that the client applications be written using a given set of application programming interfaces (APIs) for dynamic method invocation in accordance with approved technique provided for with respect to each service to be utilized (e.g., in COBRA, its Dynamic Invocation Interface or DII must be used). These dynamic interfaces allow the clients to go and look up the service interface definition document dynamically and build each method request before invoking it.

Static method invocation, which is well-known, generally requires the following steps:

1. Generate the language level interface class from the Service Definition Interface.
2. Use the interface class generated in Step 1 in the client program environment in order to write/compile the client program.
3. Generate any needed language level client proxies/stubs for each of the distributed services being used within a client side program.
4. Package the generated client proxies/stubs for each service along with its interface class with the client program and run it.

Although static method invocation requires many manual setups during development, assembly and deployment, it is used most often due to its relatively high performance (and therefore very short user delays) during runtime. But when the distributed service definition interface changes, which happens with some regularity in a changing computer environment, regeneration and preparation in order to use the new interface must be accomplished once again. This makes it necessary for the network administrators (or other computer support personnel responsible for maintaining the enterprise's network) to redeploy or otherwise update the affected client applications on the individual workstations or other end-user computers. Although such updating can now often be done remotely in a distributed computing environment, it still takes considerable time. Usually, every computer containing an affected client application must be accessed and updated, usually over lunch, after hours or on week-ends, to avoid inconveniencing end users. Such updates must often be scheduled to minimize disruptions. Hence, making such updates to all computers on a network represents a fairly major expense and is a bottleneck to maintaining applications on a network in an up-to-date state.

Dynamic method invocation, which is also well-known, attempts to solve this problem with deploying and using updated SIDDs. It generally requires the following steps:

1. Publish the Service Definition Interface information into an interface repository, which is typically maintained on one of the network servers.
2. Use the application program interfaces (APIs) provided for in approved dynamic method invocation interface APIs to exploit the distributed services dynamically inside the client program.

Dynamic method invocation requires no client side set up, packaging or deployment. But, it puts a heavy burden on the client-side programmer to write method invocations using the dynamic invocation interfaces. Also, dynamic method invocation suffers from performance problems during runtime. This is due to the time it takes on the part of the client program to retrieve each of the service interface definitions and to build thereafter each method request before its invocation. The end computer users may experience a longer delay whenever a request is made. Such delays can incrementally impair user productivity as users wait for their responses. Also, as a network's overall performance is improved, these delays become more noticeable and therefore more of an issue.

SUMMARY OF THE INVENTION

In light of the foregoing limitations associated with the known invocation methods, there is provided, in accordance with a first exemplary embodiment of the present invention, a novel software system within a distributed computing environment designed to overcome these limitations. This first embodiment includes a novel dynamic static-proxy invocation gateway and at least one, and preferably a plurality of, novel dynamic static-proxy invocation generators. Each dynamic static-proxy generator is preferably associated with a specific service to be accessed on a server and a specific service interface definition document (SIDD) associated with that service. The dynamic static-proxy invocation gateway receives requests from a client side stub, ascertains the service to be accessed by the client requests, and generates a command to the appropriate generator to dynamically generate a static client-side proxy for the requested service, if one does not yet exist.

This first embodiment typically will be used in a distributed computer environment, such as a small or large network which may also have Internet links through which clients and servers communicate. In such an environment, multiple client and multiple server programs typically are dynamically coupled and decoupled as dictated by the data access and/or data processing needs of the users and/or administrators. The system of this first embodiment, which dynamically generates client-side proxies, at a minimum comprises: a plurality of clients; at least a first server computer remote from the clients containing at least a first service to be used upon request by the clients; at least a first interface repository for storing and publishing or providing a service interface definition document for each service on the first server computer; an invocation gateway, preferably on the server computer; and at least a first dynamic static-proxy generator associated with the first service, also preferably on the server computer. As is typical of client/server architectures, each of the clients includes method invocation software for requesting use of an application associated with the first service on a remote server. The first service has at least one application associated therewith, and typically will have at least two and often several applications arranged to be used by the clients upon their request. Services which may typically be used in this manner include but are not limited to a Web service, a CORBA service or a MBean service.

The invocation gateway in this first embodiment is accessible to the clients and is arranged to monitor requests from clients which are preferably routed by the network to the invocation gateway. In particular, the gateway is arranged to monitor requests from clients, and generate a command to send to the appropriate dynamic generator associated with the requested service. Each such generator is arranged to respond to such commands received from the gateway and to generate dynamically a static proxy for use by a requesting client to access an application associated its service. The gateway is further arranged to cause any such dynamically generated static proxies from a generator to be delivered to clients which have requested use of an application of that generator's service.

Thus, the dynamic static-proxy generators constitute an adapter engine that is operable to automatically generate static invocation proxies for any given client dynamically before the method is dispatched on the client side. Hence, the system of the invention removes the programming burden from the client side when trying to invoke any known distributed services dynamically. It also has the benefit of allowing the clients to always use the latest Service Interface Definition Documents available. The gateway preferably includes a cache or other temporary memory to store, at least on a short-term basis, recently generated static proxies. Then, if another request for the same static proxy is received, the gateway can further expedite matters by fetching the requested static proxy from its memory and shipping it to the client rather than requiring the generator to produce it again from scratch.

The present invention also provide an exemplary method for dynamically generating static proxies, which maybe described as follows. The method is used in a distributed computer environment having a client side with multiple clients and a server side with multiple servers which are dynamically coupled and decoupled as needed to carry out their intended data access or data processing functions. The purpose of the method is to dynamically generate static client-side proxies on the server side, and it minimally comprises the steps of: providing a computer network to connect the client and server sides of the distributed computer environment; on the server side, providing at least at a first service to be accessed by clients; and on the server side, providing an invocation gateway accessible to the clients via the network through which gateway requests from clients for method invocations requesting the use of the first service are directed or routed.

Thereafter, as explained above with respect to the system of the present invention, upon receipt of a request from the first client, the gateway generates a first command requesting dynamic generation of a new static proxy for the first client in order to establish communications between the first client and the first service. Then, on the server side and in response to the first command, the generator dynamically generates a static proxy to be used by the first client in response to its request. The generated static proxy is preferably routed through the gateway, and in any event is sent from the server side over the network to the requesting client. Finally, the generated static proxy is used on the client side to establish communications over the network between the first client and the first service located on the server side. While this method of the present invention is, at a minimum, used with one service, in practice, the method is preferably carried out with regard to at least two services and may be used with multiple services.

Thus, from the foregoing description, it should be appreciated that the system and method of the present invention each utilize the primary advantage of the dynamic invocation, namely the continuous use of the latest interface definitions for each service to be used by a client. It should also be appreciated that they have the primary advantage of using static invocation proxies/stubs in a distributed computing environment, namely fast efficient deployment. Moreover, the approach of the present invention can benefit any distributed client's server application that has its service interface definition periodically updated. These and other aspects of the present invention maybe further understood by referring to the detailed description, accompanying Figures, and appended claims.

BRIEF DESCRIPTION OF THE DRAWINGS

The drawings form an integral part of the description of the exemplary embodiments and are to be read in conjunction therewith. Like reference numerals designate the same or similar components or features in the various Figures, where.

DESCRIPTION OF THE PREFERRED EMBODIMENTS

The present invention is illustrated and described herein in connection with certain embodiments, with the understanding that the present disclosure is to be considered as an exemplification of the principles of the invention and the associated functional specifications required for its implementation. However, it should be appreciated that the systems and methods of the present invention maybe implemented in still different configurations, forms and variations, based on the teachings herein.

The present invention can be applied to any distributed object architecture that uses Service Interface Definition documents (SIDDs). In each such embodiment of the invention, certain infrastructure is required in order to implement the invention, and to be able to easily accommodate any type of Service Interface Definition document. For each type of service having or making use of a Service Interface Definition document (or its equivalent), a Dynamic Static-Proxy Generator must be provided and a Dynamic Static-Proxy Invocation Gateway must be provided. The specific tasks that must be supported and accomplished and implemented by this infrastructure will be discussed in detail below. It is useful to visually present the various constituent parts of the system of the present invention, and show where they fit into a typical distributed computing architecture.

Figure 1:
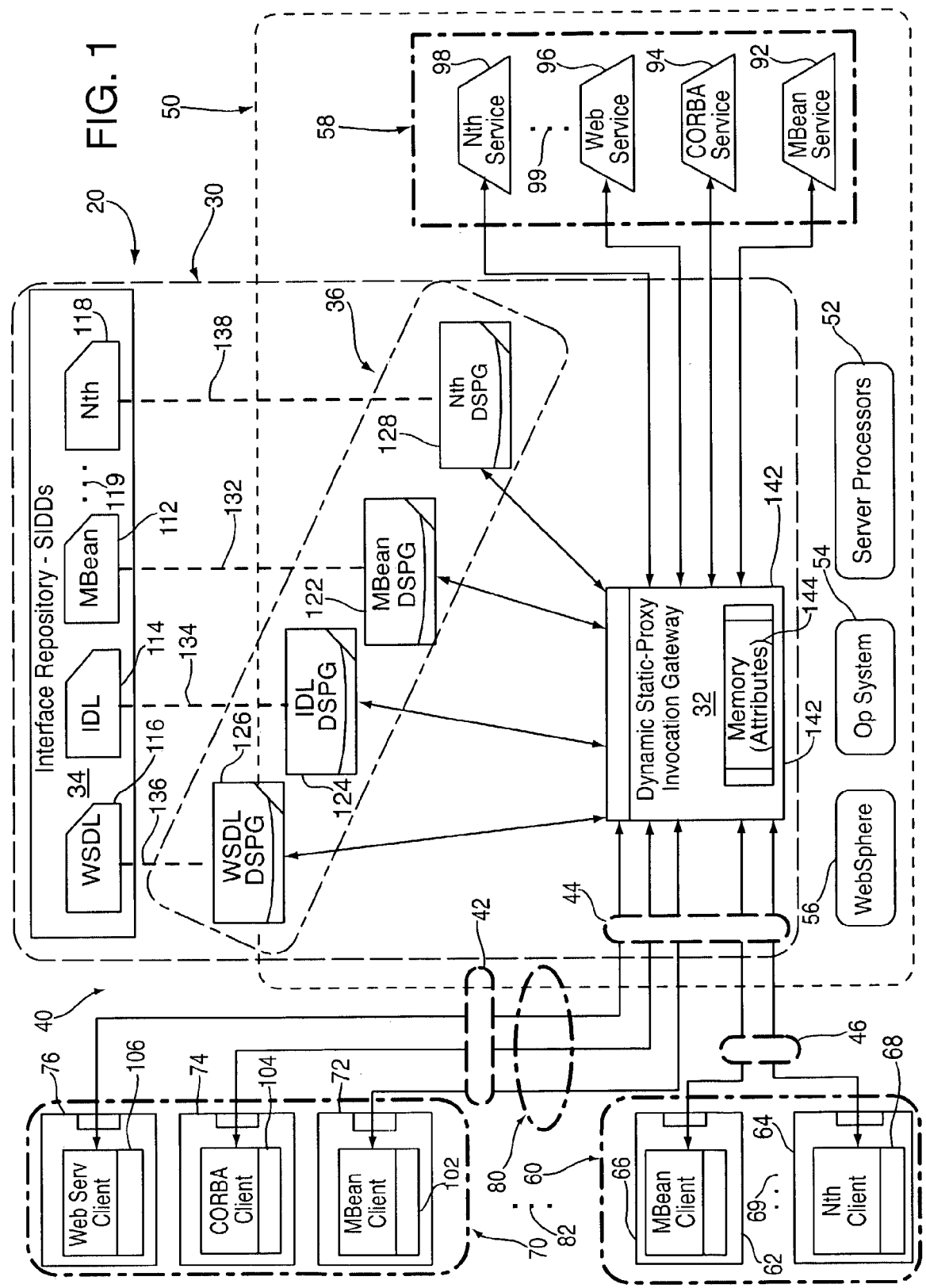
FIG. 1 is a simplified computer and signal flow block diagram to provide an overview of the environment and architecture used to implement the system and method of the present invention, which system includes an invocation gateway and dynamic static-proxy generators associated with specific application server services and associated Service Interface Definition documents.

FIG. 1 shows a representative distributed computer environment 20, and provides an overview of the components involved in implementing the system 30 of the present invention on a suitable distributed computer network 40. Network 40 preferably includes an application server system 50, at least one local computer network 60 on which client side programs reside, and at least one remote computer network 70 connected over the Internet 80, on which still further client side programs reside. The ellipses 82 are meant to illustrate that additional networks on which clients reside, whether those networks are LANs or WANs, or are remote networks or individual workstations connected to server system 50 through the Internet, may be part of this distributed environment.

As shown in FIG. 1, system 30 of the present invention includes a dynamic static proxy invocation gateway 32, an interface repository 34 including various service Interface definition documents, and a set 36 of dynamic static proxy generators, which all will be described in greater detail. The computer network 40 includes various well-known elements including known firewall/router/gateways 42, 43 and 46 and known kinds of communications paths, such as paths going through those firewall/gateways for accessing the nearby servers and remote networks 60 and 70, as shown, using known communication protocols.

The application server system 50 includes various known elements functioning is their usual way, including one or more server computers/processors 52, an operating system 54 to control and supervise them, supervisory application management software 56 to deploy, monitor and control various applications, and a set 58 of installed application services ready to be used by clients on the local and remote computer networks. These services maybe installed on suitable server computers/processors, which may be part of the processors 52, or may be found on separate machines closely linked therewith, for example, in a cluster or any other suitable configuration known to manufacturers and users of multiple processor server systems. The set 58 of application services is shown to include a MBean service 92, a CORBA Service 94, a WebService 96 and an Nth Service 98. The use of the term Nth Service, along with the ellipses 99, are meant to illustrate that there maybe additional services beyond the three types of services 92-96 expressly mentioned by name.

The local network 60 includes a plurality of end-user computers 62 and 64 on which clients are loaded, such as Mbean Client 66 and the Nth Client 68. The term Nth client, along with the ellipses 69, is used to illustrate that typically on a local network there may well be several different computers each installed with one or more clients. As is well-known, the computer of each end-user, often called a workstation, will have one or more installed software packages, each of which may have several client programs.

The remote network 70 includes a plurality of end-user computers 72, 74 and 76 on which more clients are loaded such as an MBean client 102, a CORBA client 104 and a WebService client 106 respectively. Although not shown due to space constraints, but as indicated by ellipses 82, more remote networks or workstations, each having soft are packages with multiple clients are normally found in a distributed computing environment. No matter which distributed object architecture is being used, in virtually any kind of client-server distributed computing environment, there are normally multiple clients and multiple services present.

The interface repository 34 includes four supporting Service Interface Definitions (SIDDs) 112, 114, 116 and 118 which are respectively labeled Mbean, IDL, WDSL and Nth. These SIDDs are respectively associated with MBean Service 92, CORBA Service 94, WebService 96 and Nth Service 98. The Nth SIDD 118, along with ellipses 119, signify that more SIDDs and associated services maybe implemented and used in the present invention than these three known specifically identified services.

For each service and its associated SIDD, there is a corresponding Dynamic Static-Proxy Generator (DSPG) included as part of the set 36 in the system 30 of the present invention. Specifically, for the services MBean, IDL, WSDL and Nth, there are respective DSPGs 122, 124, 126 and 128 identified as being used in conjunction with a corresponding SIDD as shown by dashed lines 132, 134, 136 and 138. As previously explained, the DSPGs generate the needed dynamic static-proxy for a given client upon request and on-the-fly, from the information found in the associated SIDD. As is well known, the SIDDs are each updated as a routine part of any enhancements or other updates to the associated service, usually automatically and as part of the installation of the update.

By way of background, MBeans are JavaBeans written and used for the management of component resources in environments like application servers, and they are run under the JMX (Java Management Extensions) system from Sun Microsystems. JMX provides simplified ways of making applications manageable, while integrating with existing management tools using SNMP, HTTP, CIM, etc., all in compliance with the J2EE (Java 2 Platform, Enterprise Edition) standard. Specifically, the JMX standard specifies instrumentation design patterns (i.e., MBeans), an MBean server, and a client interface, which permit any JMX administration client to work with any MBean server, and any MBean server to be used to administer any application whose objects have been instrumented as MBeans.

Similarly, IDL (interface definition language) lets a program or object written in one language communicate with another program written in an unknown language. One example of a program using IDL is ORB (Object Request Broker), which is an essential part of a CORBA Service. ORB is used to broker communications between object programs running on different platforms. IDL works by requiring that a program's interfaces be described in a stub or slight extension of the program that is compiled into it. The stubs in each program are used by a broker program to allow them to communicate. CORBA stands for Common Object Request Broker Architecture, and it is in wide use by many companies.

The WSDL (Web Services Description Language) protocol is an XML-based language and protocol used to describe the services a business offers and to provide a way for individuals and other businesses to access those services electronically. WSDL is the important part of the UDDI (Universal Description, Discovery and Integration) initiative which is now supported by well over 100 large companies. Using the UDDI XML-based registry, businesses worldwide can list themselves and their services on the Internet. WSDL is the language used to do this, and has become a well-known way to provide Web-based services of all types.

Since the use of MBeans and JMX, and the use of IDL and CORBA, and use of WSDL to provide Web Services of many types are all well-documented on the Internet and in the trade literature, and well-known to those skilled in the art, they need not be further described here, beyond those comments which are provided herein. Specifically, the software implementations of these standards, along with the use of SIDDs in conjunction with MBean services, CORBA services, and Web services and how to interface with them are all well known, and thus need not be further discussed here, except as set forth below in order to ensure the present invention is fully explained.

The operation of the overall system 30 of the present invention is preferably enhanced to take advantage of caching and/or periodic validation of the currentness of the dynamically generated static proxy for the requested service for a given client. In this manner, performance enhancements are possible, since static proxies for given client can be updated if the Service Interface Definition has changed, and can be dropped when it is clear that the requested service, for whatever reason, is no longer required and/or permitted. In order to accomplished this, memory 142 for storing a copy of the recently generated static proxy associated with the service, and for storing various attributes 144 of each particular service handled by the invocation gateway 32. The attributes may include but are not limited to the current availability of the service, the last time the static proxy was updated, whether the SIDD associated with a service has been updated, whether the static proxy last generated was updated to reflect the updated SIDD, whether or not to dynamically generate an updated static proxy and send it to the client currently using the service, how long a particular client has used a generated static proxy, and the like.

In an exemplary embodiment of the present invention illustrated in FIG. 1, the computer processors 52 may be from the IBM z900 series class of computers, the operating system 54 maybe IBM's z/OS operating system, and the application management software 56 may the WebSphere® application server software package. The WebSphere package runs under z/OS version 5.0 and provides application system management for dealing with MBean services (managed bean resources) under the multi-server control region server environment of the z/OS operating system infrastructure. By way of background, WebSphere refers to IBM's family of application servers which constitute a J2EE-compliant application deployment environment for applications implemented as Java server-side code. As such, a WebSphere server extends the functionality of a Web server, which is capable of responding to HTTP protocol requests, by providing the ability to execute Java server side code, allowing for the generation of dynamic content and the implementation of complex enterprise applications. The WebSphere application server includes a Java® execution engine which supports Java servlets and Java Server Pages (JSP), which is a technology for controlling the content or appearance of web pages through the use of servlets. It also includes support for Enterprise JavaBeans (EJB) and transactional database connectivity, and it supports various web services, which will be further discussed below. z/OS refers to IBM's high-performance computer operating system used with IBM's zSeries 900 line of large (mainframe) servers, which are known for being extremely scalable and secure, and which are based on the 64-bit z/Architecture.

Among other things, the WebSphere® for z/OS version 5.0 system management is capable of handling SOAP (Simple Object Access Protocol), RMI (Remote Method Invocation), and CORBA, as well as various other Web services. SOAP is a protocol which uses HTTP (Hypertext Transfer Protocol) and XML (Extensible Markup Language) as the mechanism for information exchange so that a program running under one operating system can communicate with a program in the same or another kind of an operating system. RMI (Remote Method Invocation) is a set of protocols that enables Java objects to communicate remotely with other Java objects on different computers in a distributed network. RMI is the Java version of what is generally known as a remote procedure call (RPC), but with the ability to pass one or more objects along with the request. CORBA is an software architecture and specification, developed by a large consortium of companies, working under the auspices of the Object Management Group (OMG), for creating, distributing, and managing distributed program objects or components over a network. CORBA allows programs developed by different vendors and used at different locations to communicate in a network through "interface brokers" called ORBs (Object Request Brokers), through which requests or return replies maybe made. These technologies and computer systems, to the extent they are relevant to describing the present invention, are well-understood and well-documented in various available patents and literature, and need not be further described here.

In one embodiment, the control region (CR) of the z/OS infrastructure is the location of, and as needed functions under program control as the Dynamic Static-Proxy Invocation Gateway to dynamically generate the static proxies upon request. These requests are received via MBean service requests passed to the z/OS server from outside SOAP or RMI clients that made the requests. This Gateway also controls message flow over to the multi-server regions and handles the aggregation of returned responses from each of the server regions through the Gateway. This particular embodiment contains SOAP and RMI clients within a z/OS server control region as well as the Dynamic Static-Proxy Invocation Gateway to handle each such invocation. It also caches each dynamically generated static-proxy in order enhance performance relative to subsequent requests for the same MBean services.

Figure 2:
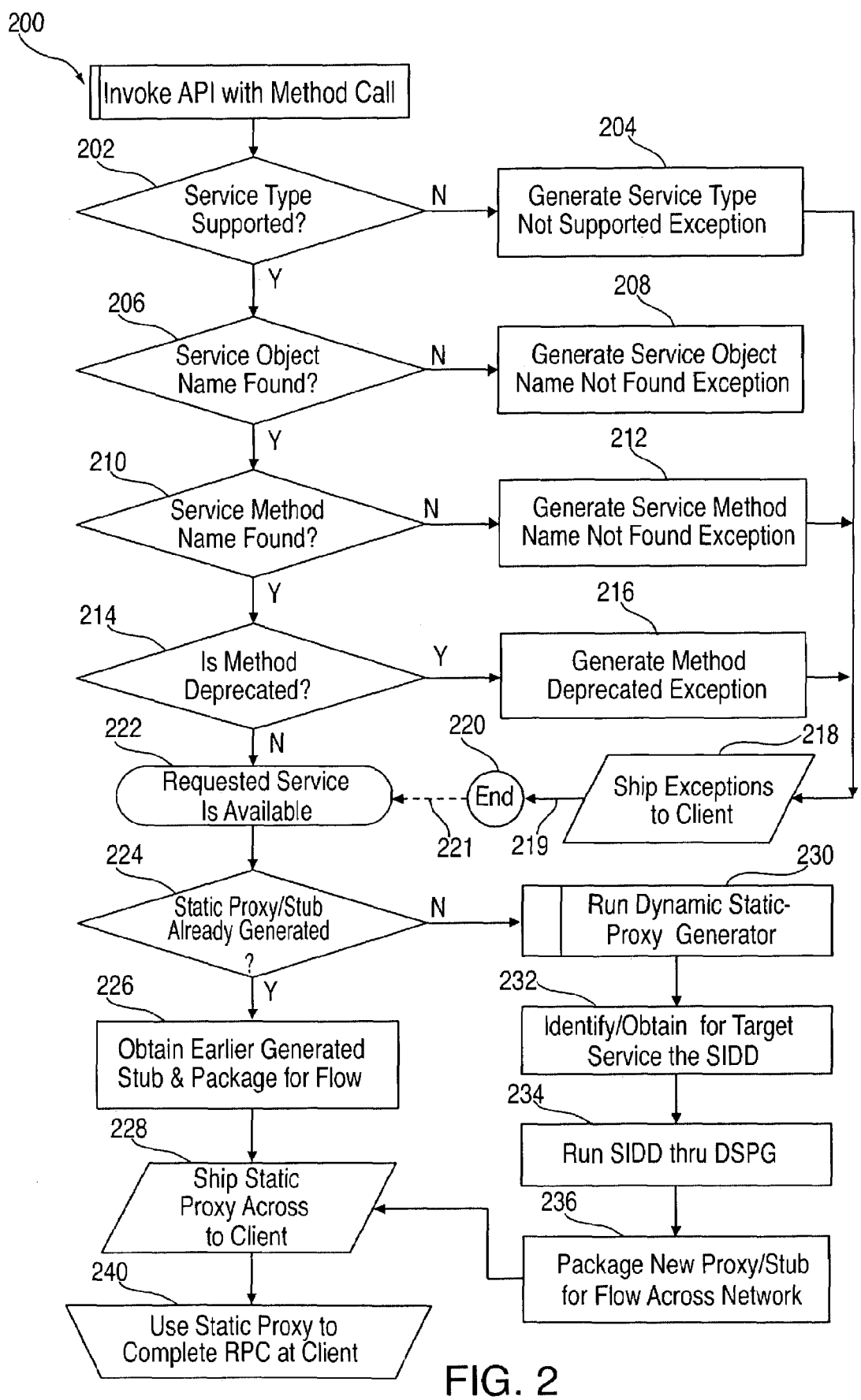
FIG. 2 is a flowchart that illustrates an important method of the present invention, namely the procedure utilized when a specific client invokes a method call to a specific service in a multiple service environment, and which also shows the return of the dynamically generated static proxy to the requesting client.

In FIG. 2, there is as flowchart of a preferred implementation of invoking this service. All client programs that are to use the new dynamic static-proxy service of the present invention preferably will use a new API (application program interface) provided by this new service. This new API may have any suitable name, such as the one given below, and it may be invoked by a suitable invoke method call. Such a method call 200 is illustrated in part in FIG. 2, and is preferably constructed along the lines of the following call:

InterfaceDynamicStaticProxyService(Object invoke (String ServiceType, String ServiceObjectName, String ServiceMethodName, string [paramTypes, object] args) throws ServiceTypeNotSupportedException, ServiceNotAvailableException, MethodNotFoundException, DeprecatedMethodException, Runtime Exception, . . . ).

First, the call 200 will be sent and received by the Invocation Gateway 32 shown in FIG. 1. Second, each invoke method call through this dynamic static proxy service interface will be checked and appropriate exceptions will be thrown if the call fails any of the following validation checks:

a. Is the ServiceType supported? (see decision block 202)
   If not, generate a ServiceTypeNotSupportedException at block 204.
b. It the ServiceObjectName found? (see decision block 206)
   If not, generate a ServiceNotAvailableException at block 208.
c. Is the ServiceMethodName found? (see decision block 210)
   If not, generate a MethodNameNotFoundException at block 212.
d. Is the method deprecated? (see decision block 214)
   If yes, generate a Deprecated MethodException at block 216.

Note that if any Exception was generated, then the control flow leads to block 218, which indicates that the status of the exception information is to be shipped to the requesting client by or under the control of the Invocation Gateway 32. At this point 219, the method call 200 is done. However, if desired, the method call can optionally provide or can be provided with information about the handling of deprecated methods. If the method is still available, even through out of date or otherwise deprecated for some other reason, then upon a positive instruction or command from the client, the requested proxy/stub generation process can be continued at connector 221, and this resulting process will now be explained.

Connector 222 is reached if all of the validation checks have been passed. Reaching this point means that the service specified in the invoke method call is available from the respective server associated with the request. At this point, it is preferred to check, as shown by decision diamond 224, as to whether the static-proxy/stub for this request has already been (recently) generated or not. In other words, is an up-to-date static-proxy already available to ship off to the client in response to the method call? If the answer is yes, then that proxy/stub is obtained from memory 142 and packaged for flow over to the requesting client, and indicated in block 226.

Fourth, if the static-client proxy/stub is not already generated, then the flow passes to block 230, so that an up-to-date static-client proxy/stub can be generated using the appropriate Dynamic Static-Client Proxy Generator Plug-in associated with the corresponding service type in order to generate the necessary code. Typically, the following tasks will be required to build this generator plugin for given type:
  a. Identify the target service's Service Interface Definition document, as stated in block 232;
  b. Given the document specified in step a as an input, run it through the Dynamic Static-Proxy/Stub Generator for that specific service, as indicated at block 234.
  c. Package the generated proxy/stub, preferably in a binary format for potential flow across the network onto the client side environment, as indicated at block 236.
  d. Ship the generated proxy/stub across the network to client, as indicated at transfer block 228.

Fifth and otherwise, if there is the existing proxy/stub that can be used on the client side, which was stored in memory, then ship that proxy/stub across the network to client, again as indicated at transfer block 228. Note that any suitable memory space in the server computer maybe used for the storage of information about how recently each type of method call has been invoked, and whether the static-proxy/stub for this method call is still current and up-to-date, and to store the recently generated proxies themselves for possible re-use. In any event, the final step in this sequence of events, which is not really part of the method call, but is included for completeness, is shown by block 240. This is the use by the requesting client of the shipped static proxy/stub to proceed with the requested communications and activity with the requested service.

In another embodiment of the present invention, a portion of the Dynamic Static-Proxy Invocation Gateway sits on the client side, even through most of it will sit on the server side, in order to keep the static client-side proxy up to date. The small blocks, such as block 244 and 246 on shown on client computers 74 and 76 are meant to illustrate this optional code from the Invocation Gateway that may sit on the client side of network, if desired. By using such client-side monitors as part of Invocation Gateway 32, when changes occur in any of the services, especially as revealed by a just-changed SIDD, the server-side of the invocation gateway may, if desired, be programmed or otherwise arranged to automatically notify the client part of this dynamic static-proxy invocation gateway of this change. In this manner, the static client-side proxy can be dynamically updated before the next request is invoked. Alternatively, the invocation gateway may be arranged to simply mark or flag that particular proxy associated with the service for update during the next invocation request.

The term "gateway" as used in the foregoing context is generally consistent with its normal meaning of a point in or part of a network that acts as an entrance and/or exit, particularly with respect to another part of a network. Gateways are often used in computer systems, and they are associated with routers (which direct packets of data that arrive) and switches (which furnish the actual path in and out of the gateway for a given packet). The present gateway is different, at least in one of its alternative forms, in that the gateway of the alternative embodiment may be arranged if desired to sit in part on the client side for reasons just previously described.

The implementation of the invocation gateway and the static-proxy generators of the present invention need not be further described since those skilled in the art, based on the teachings of the present invention, will readily understand how to implement them. Accordingly, given the foregoing teachings of the present disclosure, along with what is well-known in the art, those skilled in art will be able to implement the invocation gateway of the present invention without further explanation.

Similarly, the static-proxy generators of the present invention need not be further described since those skilled in the art, based on the teachings of the present invention, will readily understand how to implement one, especially since the use of client-side static proxies and dynamic method invocation interface APIs to exploit the distributed services dynamically inside the client programs is well-known. Also, many things are well-known about CORBA and RMI, including RMI's implementation as three layers: a stub program layer, a remote reference layer, and a transport layer. The stub program is used on the client side of the client/server relationship and a corresponding skeleton is provided at the server end. The stub appears to the servers to be the program that is calling for a service. (Sun Microsystems, the original developer of Java, uses the term "proxy" as a synonym for stub, hence the term used herein "proxy/stub"). The remote reference layer has the ability to behave differently depending on the parameters passed by the calling program. The transport connection layer sets up and manages the request. Using the foregoing programming approaches and/or other well-known protocols and tools familiar to those writing dynamic code-generating programs used in object-oriented distributed computing environments, those skilled in these kinds of software art will be readily able to code the invocation gateway and static-proxy generators of the present invention.

The present invention has been described in part by reference to block and flow diagrams and elements of systems and steps of methods. Those skilled in the art should appreciate that the present invention may be implemented by programmed computers or microprocessors installed as part of a network using any suitable software running on any suitable operating system(s) installed on any suitable hardware platforms. As is well known, suitable program instructions provided in software will turn general purpose computers and/or microprocessors into programmed computers and/or microcomputers capable of carrying out the teachings of the present invention. For example, the systems and processes of the present invention maybe written as programs or a set of interrelated routines in any suitable programming language, such as but not limited to an object-oriented language such as Java, and thereafter compiled (e.g., into Java's well-known bytecode), and then deployed and run under IBM's z/OS v5.0 System Management with WebSphere. If written in Java and compiled into bytecode, this code may be run in interpreter mode, or may be run in fully compiled code after using a Java JIT (just-in-time) compiler.

It should be appreciated by those skilled in the art that the embodiments of the present invention maybe provided as computer program products as well as systems and methods. Further, if desired, the systems, methods and software described herein may be implemented in part in firmware (including microcode) or hardware. Accordingly, the present invention may take the form of an embodiment including hardware and/or firmware, or an embodiment that is a combination of software, hardware and/or firmware. Further, the methods of the present invention maybe carried out entirely in software, or in a combination of the software, hardware and/or firmware.

Also, the software employed to implement the present invention maybe provided in any suitable form of computer program code embodied in tangible media, such as but not limited to floppy diskettes, CD-ROMs, hard drives, or any other computer readable storage medium. When such the computer program code, containing the needed instructions, is loaded into and executed by computers such as those found on a network, these computers along with the network interconnections become an apparatus for practicing the invention. Thus, it should be appreciated that another embodiment of the present invention is the computer program code needed for carrying out the processes of the present invention when it is embodied in a tangible media.

Still another embodiment of the computer program code is that code being delivered as coded signals over any known transmission medium (such as electrical wiring or cabling, fiber optics, or point-to-point electromagnetic radiation). Such coded signals, upon being impressed and installed upon general purpose computers and/or microprocessors and networks, or their respective memories, also cause the computing machines and network to become the specific devices and/or logic circuits required as part of the system or apparatus for carrying out the present invention. In other words, these computer program instructions when stored in a computer-readable memory can direct a computer or other programmable data processing apparatus to function in a particular manner, such that the instructions stored in the computer-readable memory produce an article of manufacture including instruction means which implement the function specified in the foregoing text and the accompanying Figures.

The foregoing detailed description shows that the exemplary embodiments of the present invention are well suited to fulfill the purposes above-stated. It is recognized that those skilled in the art may make various modifications or additions to the embodiments chosen to illustrate the present invention without departing from the spirit and proper scope of the invention. As a first example, different services beyond those named (for example, DCOM), may be employed. As a second example, variations in the new API discussed above, such as but not limited to recognizing and handling further exceptions. Accordingly, it is to be understood that the protection sought and to be afforded hereby should be deemed to extend to the subject matter defined by the appended claims, including all fair equivalents thereof.

What is claimed is:

1. A system for dynamically generating static client-side proxies in a distributed computer environment having multiple clients and multiple servers which are dynamically coupled and decoupled, the system comprising:

a plurality of clients, each of which includes method invocation software for requesting use of an application associated with a first service on a remote server;

a first server computer remote from the plurality of clients containing at least a first service having associated therewith a plurality of applications which are arranged to be used through a server interface upon request by any of the plurality of clients comprising a requesting client;

a first repository for storing and providing a service interface definition document for each service on the first server computer;

an invocation gateway, accessible by the requesting client through which method invocations from the requesting client are routed, the invocation gateway being arranged to monitor requests from the requesting client and generate a command requesting dynamic generation of a new static proxy for the requesting client; and at least a first dynamic-static proxy generator associated with the first service, the first dynamic-static proxy generator being arranged to respond to a command from the invocation gateway and to generate dynamically a static proxy for use by a requesting client to access an application associated with the first service to thereby update the server interface without requiring the requesting client to generate the proxy, and wherein the invocation gateway is further arranged to cause the dynamically generated static proxy from the first dynamic-static proxy generator to be delivered to the requesting client which has requested use of an application associated with the first service, the system further comprising:

a plurality of workstation computers on which a plurality of requesting clients are located;

a second server computer on which the first repository is located; and wherein the first server computer has memory for temporary storage of dynamically generated static proxies, and wherein the invocation gateway is arranged to keep track of a plurality of conditions associated with the dynamically generated static proxies, including their currentness and whether the invoked method is still being used by any of the plurality of requesting clients.

2. The system of claim 1, wherein the invocation gateway is arranged:

to release from temporary storage any static proxy no longer being used by any of the plurality of requesting clients, and to periodically check to determine whether the service interface definition document used to dynamically generate a static proxy being stored has been updated.

* * * * *